US007215278B2

(12) United States Patent
Bandhauer

(10) Patent No.: US 7,215,278 B2
(45) Date of Patent: May 8, 2007

(54) RADAR FREQUENCY HOPPING

(75) Inventor: Brian Bandhauer, Boise, ID (US)

(73) Assignee: Preco Electronics, Inc, Boise, ID (US)

( * ) Notice: Subject to any disclaimer, the term of this patent is extended or adjusted under 35 U.S.C. 154(b) by 53 days.

(21) Appl. No.: 10/715,342

(22) Filed: Nov. 16, 2003

(65) Prior Publication Data

US 2005/0104765 A1    May 19, 2005

(51) Int. Cl.
*G01S 7/28* (2006.01)
(52) U.S. Cl. .................. 342/82; 342/137; 342/159
(58) Field of Classification Search .............. 342/82, 342/137, 159, 83, 98, 100
See application file for complete search history.

(56) References Cited

U.S. PATENT DOCUMENTS

| 3,378,838 | A |   | 4/1968  | Romano ............... 343/7.7 |
|-----------|---|---|---------|-------------------------------|
| 3,500,400 | A |   | 3/1970  | Woerrlein ............. 343/9 |
| 3,757,324 | A | * | 9/1973  | Litchford ............ 342/32 |
| 5,519,400 | A |   | 5/1996  | McEwan .............. 342/28 |
| 5,576,627 | A |   | 11/1996 | McEwan ............. 324/639 |
| 5,657,022 | A |   | 8/1997  | Van Etten et al. ..... 342/104 |
| 5,682,164 | A |   | 10/1997 | McEwan .............. 342/27 |
| 5,764,162 | A |   | 6/1998  | Ehrlich .............. 340/933 |
| 5,778,317 | A |   | 7/1998  | Kaminsky ............ 455/450 |
| 5,809,059 | A |   | 9/1998  | Souissi et al. ........ 375/202 |
| 5,901,172 | A |   | 5/1999  | Fontana et al. ........ 375/200 |
| 6,026,125 | A |   | 2/2000  | Larrick, Jr. et al. ..... 375/295 |
| 6,191,724 | B1|   | 2/2001  | McEwan .............. 342/21 |
| 6,239,741 | B1|   | 5/2001  | Fontana et al. ........ 342/135 |
| 6,340,139 | B1|   | 1/2002  | Hilleary ............. 246/292 |
| 6,430,211 | B1| * | 8/2002  | Aiello ............... 375/135 |
| 6,690,741 | B1| * | 2/2004  | Larrick, Jr. et al. ..... 375/295 |

\* cited by examiner

*Primary Examiner*—Ian J. Lobo
(74) *Attorney, Agent, or Firm*—Pedersen & Co., PLLC; Ken J. Pedersen; Barbara S. Pedersen

(57) ABSTRACT

Apparatus and methods for adjusting or "hopping" the center frequency or the pulse repetition frequency of a radar system improve the co-locatability of multiple radars commonly located in a region. In a Time Domain Downconversion (TDDC) or Ultra-Wideband (UWB) radar system having a display update period between range sweeps, the preferred device comprises a frequency variable oscillator for adjusting the radar's internal timing reference frequency during a plurality of the display update periods. Radar frequency hopping methods and apparatus may result in improvements in interference immunity compared to other interference reduction techniques and may achieve cost reduction. In frequency hopping radar, if an actual target is present, the receiver waveform will repeat at the newly adjusted center frequency. Confirmation of a target is realized as an ongoing reflection and not interference.

26 Claims, 3 Drawing Sheets

Detailed Block Diagram of Preferred
Method for Frequency Hopping

Figure 1. Detailed Block Diagram of Preferred Method for Frequency Hopping

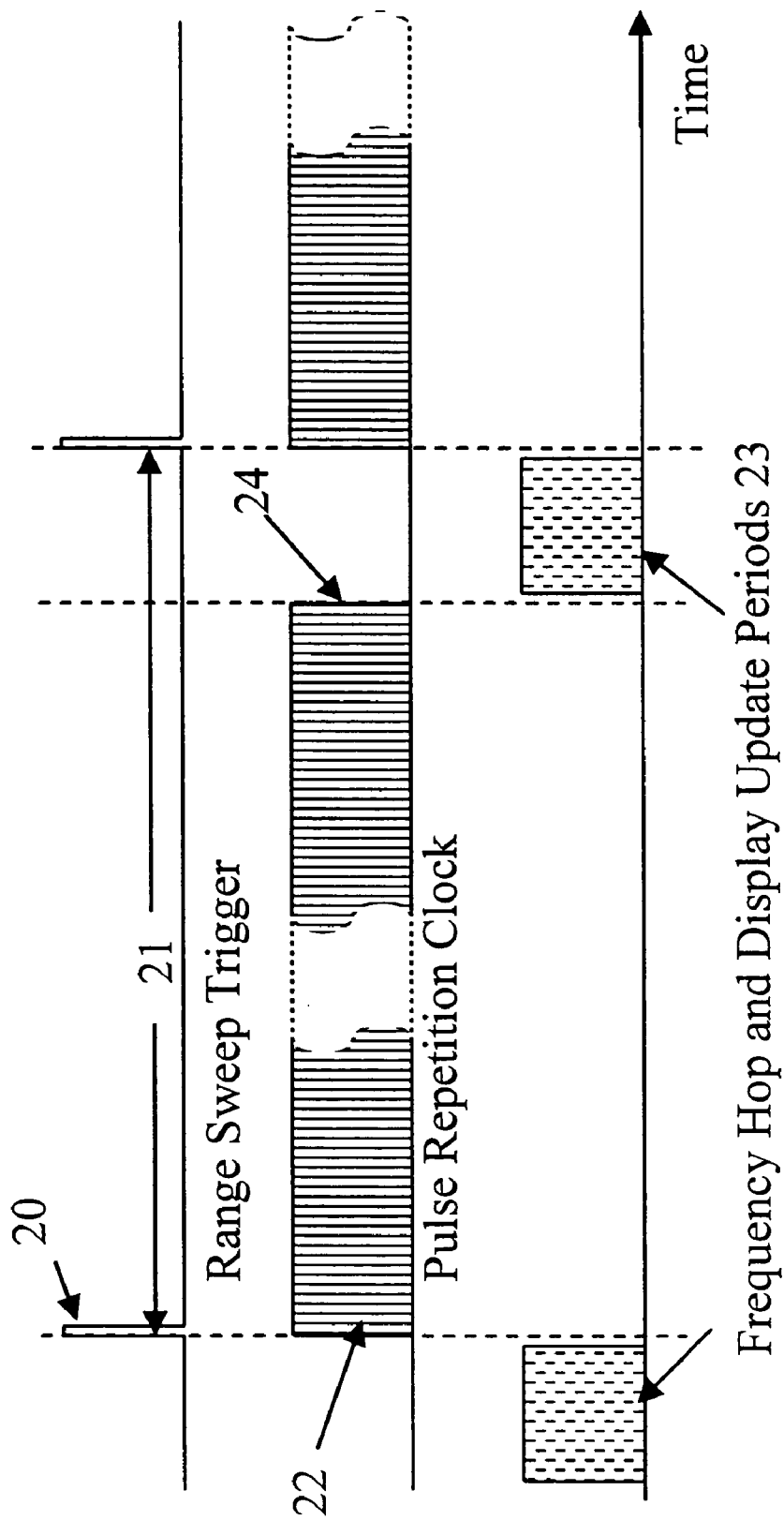
Figure 3. Timing Diagram of One Preferred Method for Frequency Hopping

RADAR FREQUENCY HOPPING

FIELD OF THE INVENTION

The present invention relates generally to radar systems, and, more specifically, to techniques that improve co-locatability and provide reduction of signal interference in radar systems.

RELATED ART

In the radar industry, it is known that a class of radar has been developed and widely patented by Thomas McEwan of Lawrence Livermore National Laboratory (LLNL) over the past 8–9 years. This type of radar is referred to as Time Domain Downconversion or TDDC technology, and is also commonly referred to as "carrier free", "baseband pulse", "impulse", "ultra-wideband" or UWB, and/or "integrated sampling down-conversion" radar. While conventional mixer-based radar technology is based upon frequency domain physics, the integrated sampling technique of TDDC directly converts the actual RF time-domain waveform into an expanded time-scale replica of the original waveform (hence, Time Domain Downconversion).

TDDC represents technology that enables micro impulse radar (MIR). The MIR technology relates to a very wide variety of radar and radar-like inventions including simple object detection radar, motion detection, stud finders, time-of-flight radio location, level sensing, material sensing, safety systems, etc.

A large body of patented art was accomplished at Lawrence Livermore National Laboratory (LLNL) during the past nine years. Almost all of the LLNL patents are associated with Thomas McEwan, and all LLNL MIR related patents bear his name. There are numerous patents relating to Time Domain Downconversion techniques. The primary technique of TDDC is covered in McEwan's two U.S. Pat. Nos. 5,345,471 and 5,523,760, both entitled Ultra-Wideband Receiver.

In these patents the basic technique of integrated sampling of thousands of coherent pulses is covered. The TDDC technique has a high degree of inherent interference rejection of non-coherent interfering signals realized by averaging out the interfering signals to some noise-like level. In all McEwan radar-related and TDDC related patents, the technique of randomly dithering the Pulse Repetition Frequency (PRF) by a small amount is used to achieve further co-location and interference rejection. This technique can work well, but it has the effect of raising the system noise floor in practice, and results in a reduction of sensitivity and maximum detection range. One possible reason for the increased system noise observed is that the constant small changes in operating frequency and timing clock are essentially equivalent to phase noise or jitter.

U.S. Pat. No. 5,361,070 for Ultra-Wideband Radar Motion Sensor describes ultra-wideband ("UWB") radar motion sensing in which a UWB radar operates as a pulse-echo system that clocks the two-way time of flight of a very short electrical pulse. Rather than employing a carrier frequency, a fast electrical voltage impulse is applied directly to an antenna. The resulting spread spectrum emissions resemble the Fourier transform of the emitted pulse and generally span hundreds of megaHertz to several gigaHertz. Because most materials exhibit rapidly increasing attenuation with frequency, UWB radar is advantageous for materials penetration, allowing installation of UWB radar detectors behind walls and appliance panels, above ceilings, and below floors. UWB radar motion detectors are also advantageous for detecting close objects and may have an adjustable sensing range.

Note that all McEwan MIR patents are impulse ultra-wideband radars. Thus they are essentially "carrier-free" in that they transmit a spectral content equal to the impulse response of the antenna used. LLNL technology has allowed the TDDC technique to be applied to a carrier-based RF transmission by making the transmission a harmonic of the PRF clock.

Several known MIR-related patents by McEwan are listed below in chronological order. There are many others, but these represent the earliest core of the technology.

U.S. Pat. No. 5,361,070—Ultra-Wideband Radar Motion Sensor—Uses TDDC to detect changes in the radar return as a function of range (discussed above).

U.S. Pat. No. 5,465,094—Two Terminal Micropower Radar Sensor—Uses TDDC in a basic fixed range motion detector radar configuration.

U.S. Pat. No. 5,510,800—Time-Of-Flight Radio Location System—Uses multiple TDDC receivers in a basic range-swept radar configuration to discern location.

U.S. Pat. No. 5,512,834—Homodyne Impulse Radar Hidden Object Locator—Uses TDDC in a basic range-swept radar configuration.

At least one other company, Sentrol Incorporated, is known to be also using the licensed LLNL technology to transmit bandlimited RF signals.

While the technology in each of the above prior art references has its individual merit, none of the prior art was discovered to resemble the present invention, nor is any of the prior art able to qualify as a standalone detector device. There is still a need for a device and method that overcome disadvantages of the prior object-and-motion-detection radars, especially with regard to their co-locatability. Co-locating radars of the same type can easily overlap, since oscillators are similar, and interference occurs if another signal falls within the intended receiver's sampling window. The present invention addresses this and other problems.

SUMMARY OF THE INVENTION

The present invention comprises apparatus and methods for adjusting or "hopping" the center frequency or the pulse repetition frequency of a radar. Preferably, the invented apparatus and methods provide control of a radar wherein the system timing reference frequency is repeatedly adjusted, from one stable system timing reference frequency to another. This may have the advantages of a) maximizing receiver sensitivity, b) not utilizing any single system timing reference frequency for an extended period of time, and c) avoiding extended reception of interfering signals in a region, including other similar transceivers.

The invented system includes a frequency variable oscillator to adjust the transceiver's system internal timing reference frequency, wherein said adjustment is made for the purpose of significantly improving the co-locatability of multiple transceivers commonly located in a region. The time between adjustments of said frequency variable oscillator is preferably made long compared to the transmit pulse repetition frequency, in order to preserve the minimum noise floor in the radar, thereby maintaining maximum sensitivity and signal-to-noise ratio. The timing between adjustments may be equal, unequal but in a predefined and fixed pattern, random, or semi-random, for example.

Presently, the inventor prefers to utilize the fundamental techniques developed for Ultra-Wideband Radar UWB, in conjunction with band-limited transmissions. The invented technology may be implemented using radio frequency electronics that are far simpler than conventional radars. This allows for a significant cost reduction, and also a high-level of inherent noise immunity. As known in the industry, the TDDC radar method is accomplished using a repeated micro-sampling of an RF signal. Echoes from the originally transmitted RF signal are gradually reconstructed using at a much lower frequency, in the process known as downconversion, by sweeping the sampler in time and integrating, or summing, all of the samples, which typically number in the thousands to millions per sweep.

The core TDDC technology is based upon integrating or summing thousands-to-millions of very small samples of the RF pulse echoes, or radar return. In a radar capable of providing range information, this sampling is done on a sliding time-delay basis relative to the transmit pulse where each consecutive sample is delayed in time by a very small amount relative to the previous sample. The end-result is a replica of the actual RF radar echoes reproduced at a much lower frequency and on an expanded propagation time-scale showing how far away in time the echo originates.

This downconversion in frequency is done without the usual (mixer+local oscillator+image-select-filtering) method that has typically been required in previous technologies utilizing an RF carrier for some purpose. In order for this technique to be successful, the RF signal must be repetitive and extremely stable in time. The receiver sampling clock must be perfectly timed with the RF transmission repetition clock in order for the microsamples to add constructively. This requirement for the transmitted and receive clocks to be perfectly synchronized is easily realized in a radar system where the same timing reference oscillator may be used for both the transmitter and the receiver.

The utilization of synchronized transmit and receive clocks offers inherently higher degrees of interference immunity since interfering signals are rarely continuously stable in time with respect to the reference timing oscillator. The sum from such "incoherent" signals averages out to a small, noise-like signal over time. However, in that case where there are multiple similarly constructed TDDC devices operating in a single area, there can be a high incidence of overlap since all of the device oscillators are so similar.

Fortunately, all such interference potential is very narrowband due to the nature of TDDC. In the case of similar radar units co-located, interference only occurs when the PRF oscillators are within a few Hertz to a few tens of Hertz with respect to each other.

The traditional approach for improving upon the interference rejection, especially for co-located TDDC devices, is to "dither" the pulse clocks. The technique of randomly dithering is accomplished when the synchronized transmit and receive clocks simultaneously move in frequency a small amount for each individual pulse or so. Dithering the Pulse Repetition Frequency (PRF) for each pulse is used successfully since the relative transmit time and sampling time still remain coherent with respect to one another. The price paid for this technique is an increased noise floor in the receiver. This is likely due to the equivalence of oscillator phase-noise although there may be other noise sources introduced by the constant shifting of the system clock. This naturally limits the maximum range that a radar can operate and the minimum target it can detect.

If the PRF is kept constant for a whole range sweep, maximum performance is realized, particularly if no interfering signal is present. If an interfering signal is present, then data in that sweep may be corrupted or jammed. Constant interference is avoided by moving the PRF to a new frequency for the next sweep. For TDDC based radars, this is preferably in the range of a few Hertz to tens of Hertz adjustment of the PRF clock, which equates to a few KHz to tens of KHz at the carrier level. If an actual target is present, the receiver waveform repeats at the newly adjusted frequency, and confirmation of an actual target is realized.

The present invention preferably "hops" the oscillators to a new frequency at some controlled time, with the "hop" being a set, discreet amount. In the case of a radar, an ideal time to change the clock is during reset of the range sweep. This technique keeps the timing clock stable for a long period of time (long relative to the individual pulses), thus minimizing the noise floor and increasing sensitivity. Then, the oscillator changes to a new stable frequency. If there happens to be interference at some frequency, the interference will most likely last only for the dwell time that the clock stays at that particular frequency. Once the oscillator hops to a new frequency, the interference should cease. Fortunately, the inherent interference rejection of the TDDC technique makes any interference a very narrowband phenomenon, and the frequency hops can be quite small and still be successful. In most typical systems, the clock dwell time will likely be a few tens of milliseconds or so per range sweep, thus minimizing the effects of interference occurring for a sustained period of time.

Additional objects and advantages of this invention will be apparent from the following detailed description and the accompanying drawings.

BRIEF DESCRIPTION OF THE DRAWINGS

FIG. 3 is a preferred timing diagram of an embodiment of the present invention.

DETAILED DESCRIPTION OF THE INVENTION

Figure 1:
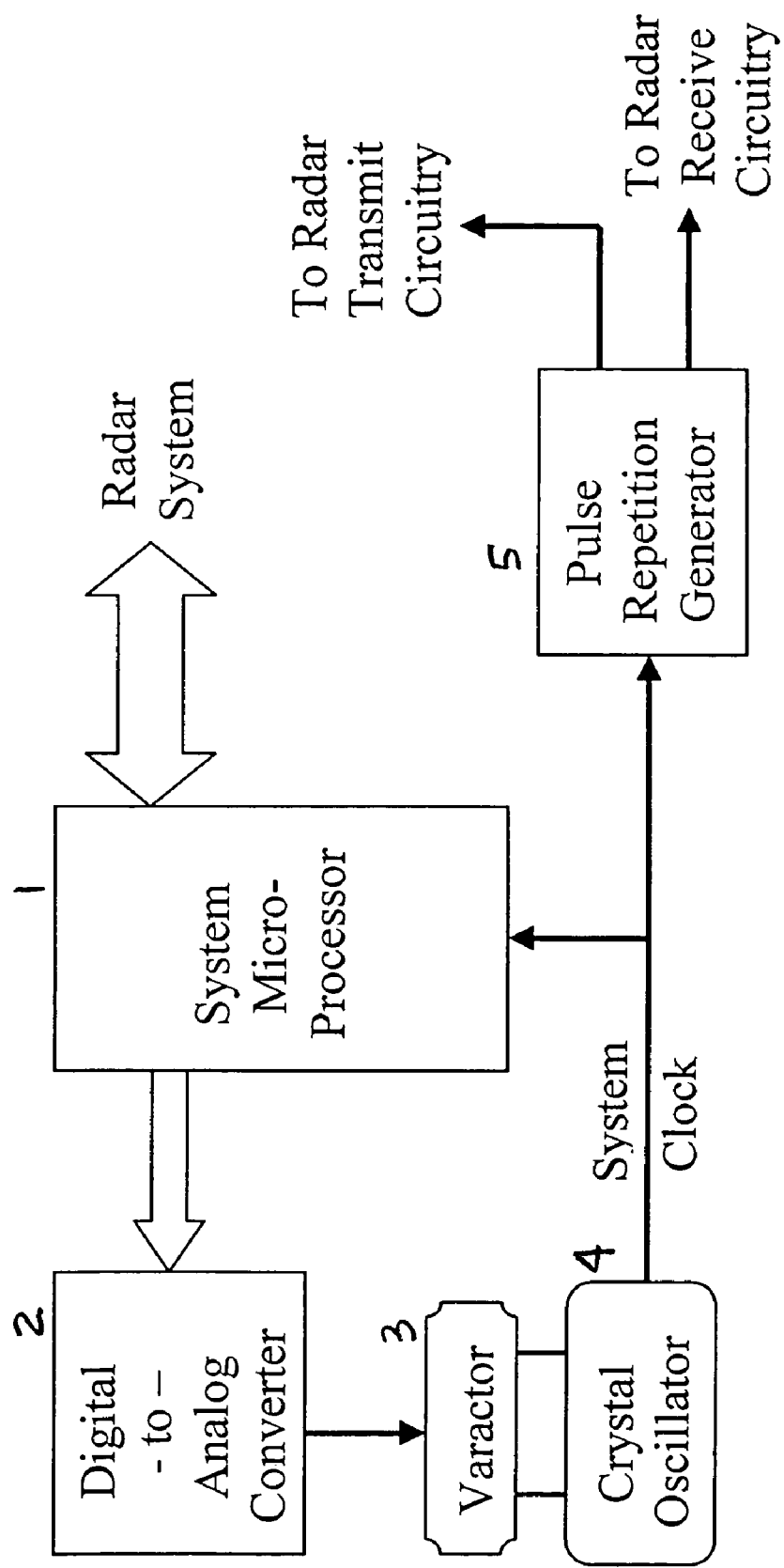
FIG. 1 is a schematic block diagram of a preferred embodiment of the present invention.

As regards the present invention, it should be noted that the circuitry and methods that are described herein and that are claimed are intended to control any variety of radar systems. Classes of radar include but are not limited to the Time Domain Downconversion Radar (TDDC), described above, as well as conventional radars.

In conventional radar technology, an RF carrier is generated either directly by an RF oscillator or via some up-conversion technique. Up-conversion methods would most commonly consist of an information signal being generated at a frequency considerably lower than the intended RF carrier. This signal would then be fed into a mixer fed by an RF oscillator such that one of the frequency-domain summation terms from the mixer would be used as the intended transmit signal. The basics of this technique would be similar for CW Doppler radars (including FM CW) and pulsed radars, which come in a great variety of versions and modulation types (chirp, pulsed, pulse encoded, etc.). The receivers for these radars will work in reverse by typically downconverting via a mixer to some convenient lower frequency where signal processing takes place. For these types of radars, the interference bandwidth (including co-location) will typically be much larger than the TDDC radar. Frequency Hopping is effective for such radars by making the hop frequencies appropriate to the size of the expected interference bandwidth. Maximum performance will be realized by holding steady-state for some period of time, and then quickly hopping to another center frequency for some beneficial steady-state period of time. Any relatively narrowband interference present would be visible only for a brief period of time while operating on a problem frequency.

The preferred embodiment of the present invention is specific to a TDDC radar. In order for the TDDC technology to function well, each RF pulse must be phase-coherent. This rules out simply switching an oscillator in-and-out. One method of successfully realizing repetitive phase-coherent pulses is to pulse a tuned, high-gain RF amplifier on and off at the Pulse Repetition Frequency (PRF). This amplifier is stable in itself, so it won't oscillate unpredictably while turned on. If the amplifier is gated on/off with a harmonically rich signal, then the amplifier will lock onto and amplify these harmonics. In the case of the radar of the preferred embodiment, an RF transistor (GAsFET) is gated on-and-off using a fast-rise-time 74AC04 CMOS inverter gate. The GAsFET transistor is tuned to a center frequency using trimmed gate-to-ground inductance, a trimmed open-ended stub on the GasFET drain, and a potentiometer-adjusted bias voltage to fine tune the desired harmonic. This results in a close-to-ideal pulse with associated sine-function spectrum (sin c(x)=sin(x)/x). RF output amplitude is controlled by a resistive attenuator before being transmitted by the antenna. Note that a conventional RF amplifier could be placed after the pulsed amplifier if more RF power was desired.

In the radar receiver, the RF signal is first amplified and filtered via conventional methods as would be done in almost any RF receiver. Then the RF signal is sampled and integrated. The sampler consists of a small capacitor that gets switched into the RF path for a very short period of time once every PRF cycle. The ideal switched-in time for this capacitor is ½ of the RF carrier period. At 5.8 GHz, this is 86 picoseconds. Note that any odd number of ½-carrier-cycles also works well. This time is crucial to allow the capacitor to maximally charge in the presence of a signal. A smaller fraction of the carrier period still works, but it reduces the efficiency. An on-time equal to an even number of ½-carrier-cycles will cancel itself and provide no useful output.

When this sampling capacitor is switched back out of the RF path, the capacitor discharges into a much larger capacitor. This larger capacitor is the summing capacitor where integration takes place. Each consecutive sample discharges into the summing capacitor. This rapid switching is done via a step diode and a pair of back-to-back high-performance Schottky diodes with circuit component values and parasitics tuned to create the proper switching time.

Since each sample is phase-coherent with the previous sample, the original waveform is reconstructed bit-by-bit with each bit added at a much slower time scale created by the combination of the PRF and the sliding tiny delay between consecutive samples. In Preco Electronics radars (of Boise, Id., U.S.A.), the 5.8 GHz signal is converted to 13 KHz in one radar version and to 1.5 KHz in another version by adjusting the rate of the sliding delay. Typical timing of the hopping period is on the order of 5 to 50 Hertz in the preferred embodiment. This is accomplished by quickly changing the voltage setting of a varactor once at the beginning of each sampling period, when the range sweep is re-started. The setting of varactor voltage "pulls" the crystal frequency proportionally and effects a voltage controlled oscillator (VCO). The crystal is specified to resonate at 11.059 MHz in the inventor's working equivalent circuit to the preferred embodiment.

Referring specifically to the figures, FIG. 1 is a schematic block diagram of a preferred embodiment of the invention, wherein system microprocessor 1 controls the operation of Digital to Analog Converter (DAC) 2, which outputs a control voltage to tuning varactor 3, which pulls the frequency of crystal oscillator 4, depending upon the DAC tuning voltage. Crystal oscillator 4 outputs a system clock, which clocks the microcontroller 1, and pulse repetition generator 5. Pulse repetition generator 5 outputs two pulse repetition frequency (PRF) clocks; one that drives the radar transmitter and one that drives the radar receiver.

Figure 2:
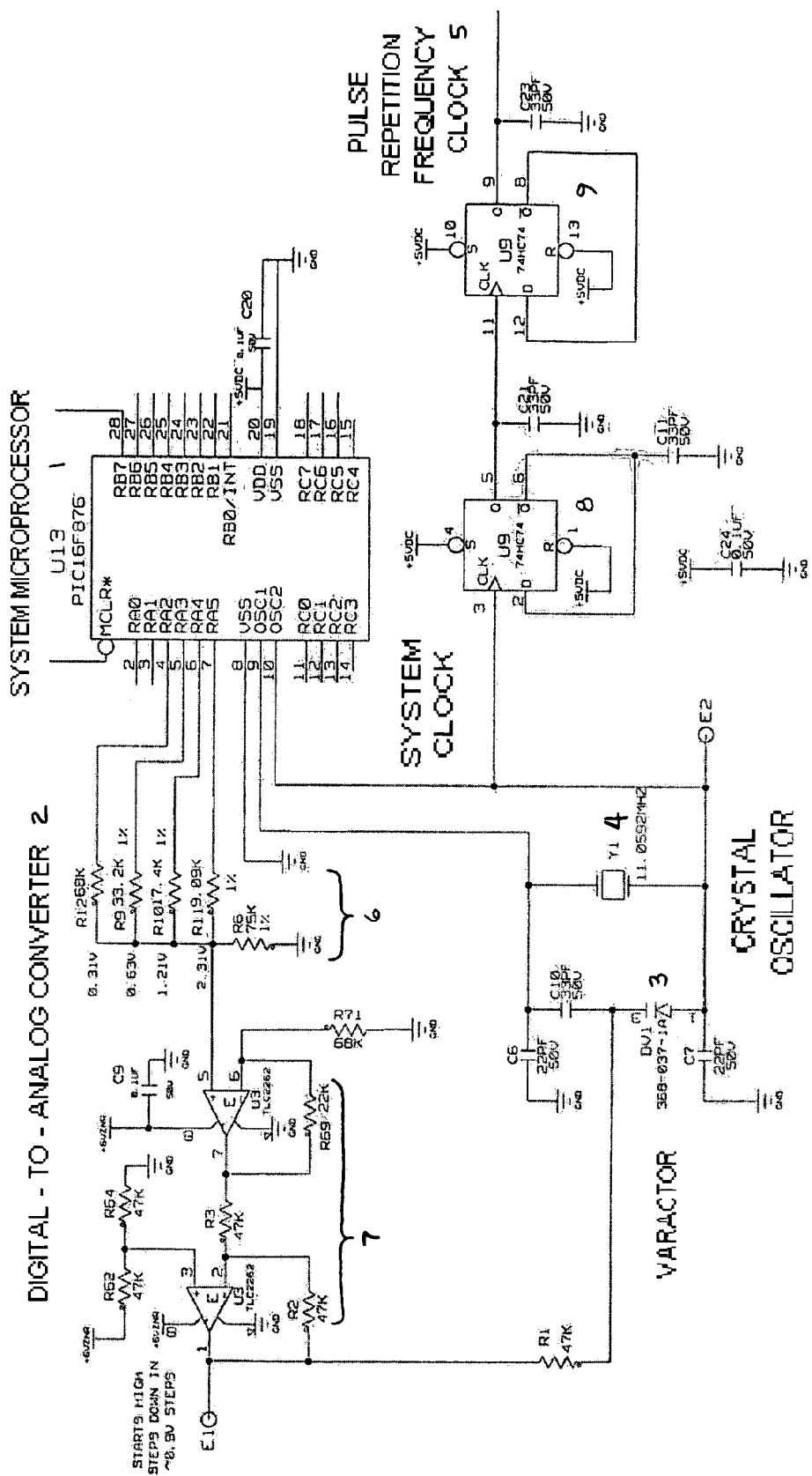
FIG. 2 is a detailed schematic diagram of a preferred embodiment of the present invention.

FIG. 2 is a detailed schematic diagram of another preferred embodiment of the present invention. The detail of implementation of the DAC 2 in this figure shows a resistor divider 6 that provides a binary selectable voltage output to amplifier 7, which in turn tunes crystal oscillator 4 by way of varactor 3. In this embodiment, dividers 8 and 9 accomplish a divide-by-four function, such that the crystal frequency (11.059 MHz) is divided down to 2.76 megaHertz.

FIG. 3 illustrates a preferred timing diagram showing when frequency hopping is implemented. The timing of events as shown in FIG. 3 are as follows: At the point of time of range sweep trigger 20, the Pulse Repetition Clock 22 begins. The sweep period 21 is the total period of the repeating cycle of range sweep and frequency hop-display update. The completion of the range sweep (or "sweep over range") at 24 is the time at which frequency hop and display update period 23 can begin.

The radar operates in a normal, stable mode during each range sweep (from 22 to 24) where the radar looks for objects from minimum search range to maximum search range. Once a range sweep is finished, the radar target indicator display is updated, and the carrier frequency is hopped to a new semi-random or pre-defined carrier frequency some time during period 23. The period between hops is a period during which the oscillator frequency is stable. The frequency adjustments ("hops") may occur in-between each range sweep (that is, at each display update, or "during consecutive display updates") or may be chosen to be at each $2^{nd}$ display update, at each $4^{th}$ display update, or at another multiple of display update or in another pattern, so long as the hopping occurs only at the times in between range sweeps. This hop in frequency may be quite small (i.e., a few tens of Hertz, for example, 20–80 Hertz) as used in the preferred application shown in FIGS. 1 and 2 which is optimized for use with Time Domain Downconversion (TDDC) radar systems, or it may be as large as desired for other types of radar systems or other embodiments of TDDC radars. Increasing stability of the clock frequency during the duration of any single range sweep (between hops) reduces phase noise and thereby maximizes radar sensitivity.

The hops may be increases, decreases, or a combination of both. The increases and/or decreases may be in any pattern or may be in a random or semi-random manner. The hops, whether increases or decreases, may be of the same amount, different amounts, of a combination.

The invention may therefore comprises a method and/or a device for control of a radar wherein the system internal timing reference frequency is repeatedly or "periodically" adjusted to another stable system timing reference frequency. This may have the advantages of maximizing receiver sensitivity, not utilizing any single system timing reference frequency for an extended period of time, and avoiding extended reception of interfering signals in a region, including other similar transceivers. The device uses a frequency variable oscillator to periodically adjust the radar's system internal timing reference frequency, with the adjustment being made for the purpose of significantly improving the co-locatability of multiple transceivers commonly located in a region. The period of timing adjustment of said frequency variable oscillator may be made long compared to the transmit pulse repetition frequency, in order to preserve the minimum noise floor in the transceiver, thereby maintaining maximum sensitivity and signal-to-noise ratio. The method may comprise the system timing reference frequency adjustment being randomly or semi randomly distributed over time, such that multiple of the transceivers commonly located in an area have randomly distributed system timing references relative to one another. This may result in any occurrence of overlapping system timing reference frequencies being occasional and always lasting for only a temporary period of time. The periodic adjustment of the system timing reference frequency preferably occurs between sampling sweep cycles and therefore may have no impact upon the stability of the system timing reference during any single sweep period, thus maintaining maximum system sensitivity.

In one approach, the invented control system has the oscillator performing the adjustments/hops during randomly or semi randomly selected display update periods, such that multiple of said radars located in the same area have randomly distributed system timing references relative to one another so that any occurrence of overlapping system timing reference frequencies is occasional and always lasting for only a temporary period of time. In another approach, the system timing reference frequency adjustments/hops are predetermined and distributed over time so that multiple said radars commonly located in an area have predetermined distributed system timing reference frequency that is relative to some start time or other desired reference point for the purpose of synchronization of intended radars and interference exclusion of all other devices.

The invented device may utilize a simple electronically controlled (voltage controlled, current controlled or digital controlled) oscillator and a control circuit to implement desired frequency hopping. The device may utilize an electronically controlled oscillator, and encoded microprocessor control in the oscillator to realize the desired adjustment of the system timing reference frequency by control of a software program. Alternatively, the device may utilize an electronically controlled oscillator and hardware timing circuitry to control the oscillator.

Although this invention has been described above with reference to particular means, materials and embodiments, it is to be understood that the invention is not limited to these disclosed particulars, but extends instead to all equivalents within the scope of this description and the following claims.

What is claimed is:

1. In a Time Domain Downconversion Radar system having a system internal timing reference frequency, a wideband pulse transmitter, and a wideband receiver with a narrow interference bandwidth, so the Radar system is a self-contained detector, and a display update period between range sweeps, a device comprising a frequency variable oscillator for adjusting the radar's internal timing reference frequency, the oscillator being adapted to perform a frequency adjustment in said internal timing reference frequency during a plurality of the display update periods, the oscillator also being adapted for adjusting both the transmitter and receiver timing, so that both the transmitter and receiver clocks are synchronized, wherein said frequency adjustment improves the co-locatability of multiple radars commonly located in a region.

2. The device of claim 1 wherein said oscillator performs said adjustment during consecutive display update periods.

3. The device of claim 1 wherein said oscillator performs said adjustment only during some of said display update periods in a predefined pattern.

4. The device of claim 3 wherein said predefined pattern is every $2^{nd}$ display update period.

5. The device of claim 1 wherein said predefined pattern is every 4th display update period.

6. The device of claim 1 wherein the oscillator performs said adjustment during randomly or semi randomly selected display update periods, such that multiple of said radars located in the same area have randomly distributed system timing references relative to one another so that any occurrence of overlapping system timing reference frequencies is occasional and always lasting for only a temporary period of time.

7. The device of claim 1 wherein the system timing reference frequency adjustment is predetermined and distributed over time so that multiple said transceivers commonly located in an area have predetermined distributed system timing reference frequency that is relative to some start time or other desired reference point for the purpose of synchronization of intended radars and interference exclusion of all other radar devices.

8. The device of claim 1 wherein said oscillator is selected from the group consisting of: a voltage controlled oscillator, a current controlled oscillator, and a digital controlled oscillator, and the device further comprises a control circuit.

9. The device of claim 1 wherein said oscillator is an electronically controlled oscillator and said device further comprises an encoded microprocessor control in the oscillator to affect said adjustment of the system timing reference frequency by control of a software program.

10. The device of claim 1 wherein said oscillator is an electronically controlled oscillator and said device comprises hardware timing circuitry to control the oscillator to affect the said adjustment of the system timing reference frequency.

11. The device of claim 1 wherein a first of said adjustments is in the range of 20–80 Hertz, and each subsequent adjustment is in the range of 20–80 Hertz.

12. The device of claim 1 wherein a first of said adjustments is either an increase or a decrease and each subsequent adjustment is either an increase or a decrease.

13. The device of claim 1 wherein said adjustments in said plurality of display updates periods alternative between increase or decrease adjustments.

14. A method of controlling a Time Domain Downconversion Radar system having a system internal timing reference frequency, a wideband pulse transmitter, and a wideband receiver with a narrow interference bandwidth, so the Radar system is a self-contained detector, and a display update period between range sweeps, the method comprising:

providing a frequency variable oscillator;

causing said frequency variable oscillator to perform a frequency adjustment during a plurality of the display update periods;

causing said frequency variable oscillator to adjust both the transmitter and receiver timing so that both the transmitter and receiver clocks are synchronized, and so that the frequency adjustment improves the co-locatability of multiple radars commonly located in a region.

15. The method of claim 1 wherein said oscillator performs said adjustment during consecutive display update periods.

16. The method of claim 1 wherein said oscillator performs said adjustment only during some of said display update periods in a predefined pattern.

17. The method of claim 3 wherein said predefined pattern is every $2^{nd}$ display update period.

18. The method of claim 1 wherein said predefined pattern is every 4th display update period.

19. The method of claim 1 wherein the oscillator performs said adjustment during randomly or semi randomly selected display update periods, such that multiple of said radars located in the same area have randomly distributed system timing references relative to one another so that any occurrence of overlapping system timing reference frequencies is occasional and always lasting for only a temporary period of time.

20. The method of claim 1 wherein the system timing reference frequency adjustment is predetermined and distributed over time so that multiple said transceivers commonly located in an area have predetermined distributed system timing reference frequency that is relative to some start time or other desired reference point for the purpose of synchronization of intended radars and interference exclusion of all other radar devices.

21. The method of claim 1 wherein said oscillator is selected from the group consisting of: a voltage controlled oscillator, a current controlled oscillator, and a digital controlled oscillator, and a control circuit controls said oscillator.

22. The method of claim 1 wherein said oscillator is an electronically controlled oscillator and the method further comprising an encoded microprocessor control in the oscillator that affects said adjustment of the system timing reference frequency by control of a software program.

23. The method of claim 1 wherein said oscillator is an electronically controlled oscillator and said device comprises hardware timing circuitry to control the oscillator to affect the said adjustment of the system timing reference frequency.

24. The method of claim 1 wherein a first of said adjustments is in the range of 20–80 Hertz, and each subsequent adjustment is in the range of 20–80 Hertz.

25. The method of claim 1 wherein a first of said adjustments is either an increase or a decrease and each subsequent adjustment is either an increase or a decrease.

26. The method of claim 1 wherein said adjustments in said plurality of display updates periods alternative between increase or decrease adjustments.

* * * * *